RESETTABLE DELAY FLOP

Filed Sept. 2, 1954

INVENTOR

ROBERT D. TORREY

BY *E. Jerry Light*

ATTORNEY

United States Patent Office 2,792,506

Patented May 14, 1957

2,792,506

RESETTABLE DELAY FLOP

Robert D. Torrey, Philadelphia, Pa.

Application September 2, 1954, Serial No. 453,833

15 Claims. (Cl. 307—88)

This invention relates to delay flops, and more particularly to resettable delay flops, although it is not limited to the latter.

A delay flop is a desirable element in certain computer circuits and is a device which upon receipt of a control signal or pulse produces an output signal of predetermined length or one having a predetermined number of output pulses. A resettable delay flop is one in which the device will respond to a second input signal which arrives before the output, due to the first input signal, ceases. For example, assume that a given delay flop will produce an output which continues for a time period T following receipt of an input control signal. In a resettable delay flop, if a second control signal is received at the input prior to the expiration of time T, the output will continue for a time period T following the second control signal. In a delay flop that is not resettable, the second input signal has no effect and the output signal terminates at the end of time period T following the first input control signal.

Delay flops are well known in the prior art and have usually employed vacuum tube circuits. There are certain computer circuits, such as those employing magnetic amplifiers, which do not tie-in well with the prior types of delay flops, and it is desirable to provide a delay flop which can be conveniently applied to the latter type of computer circuits.

In view of the foregoing, it is a primary object of this invention to provide a delay flop which overcomes the disadvantages of the prior art.

It is a further object of this invention to provide an improved form of resettable delay flop.

Still another object of the invention is to provide a delay flop that may be conveniently used in a computer circuit employing magnetic amplifiers.

Another object of the invention is to provide a delay flop which does not use vacuum tubes or other components likely to burn out.

Still an additional object of the invention is to provide a delay flop of very small physical size.

Another object of the invention is to provide a delay flop that is low in cost and yet effective.

An additional object of the invention is to provide a delay flop that is more reliable in operation than the prior art types.

In addition, it is an object of the invention to provide a delay flop having the same advantages over conventional delay flops as magnetic amplifiers have over conventional vacuum tube circuit arrangements.

In carrying out the aforesaid objects, I provide a transformer having a saturable core. The primary of this transformer is connected to the input and in response to an input pulse the core is reset to its most negative value of flux density. The secondary winding of this transformer is energized by a generator of power pulses which emits a series of spaced pulses. These pulses increase the flux density of the core step by step until saturation is reached. It, therefore, requires a predetermined number of pulses to saturate the core. Until saturation is reached, the core has high impedance. The circuit is so arranged that when the core has high impedance, pulses will flow to the load. However, when a core reahces saturation, the secondary winding will have low impedance and will prevent further flow of pulses to the load. Consequently, following an input pulse there will be a predetermined number of power pulses passing to the load prior to the time that the core becomes saturated, at which time no further power pulses flow to the load. If prior to the conclusion of said predetermined number of power pulses an additional input pulse appears, the core will be reset and the aforesaid predetermined number of power pulses will be required to again saturate the load. Therefore, the device is a resettable delay flop because it will emit said predetermined number of power pulses following the last input pulse.

Figures 1, 2, 3:
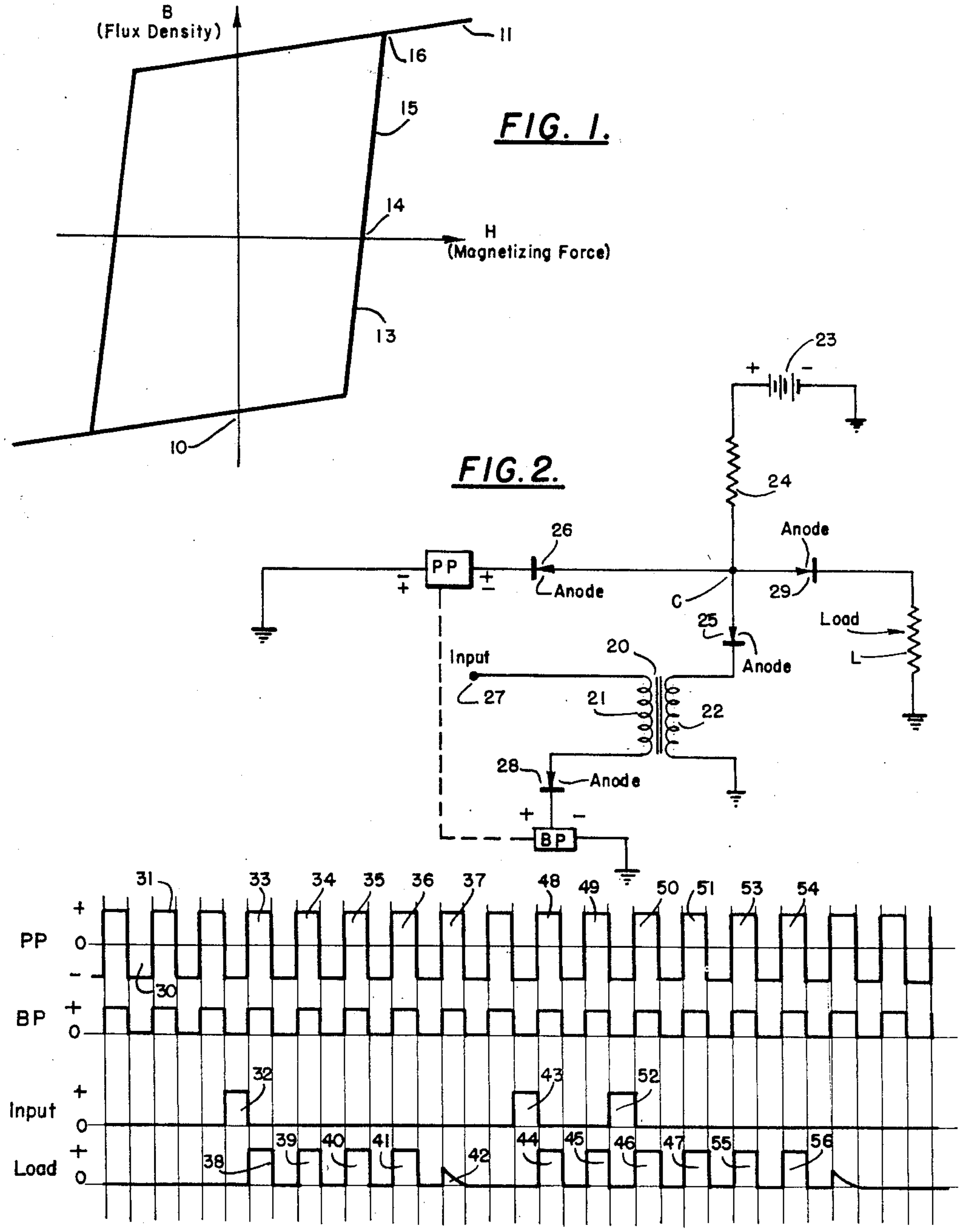
Figure 1 is an idealized hysteresis loop for the core 20 of Figure 2.
Figure 2 is a schematic diagram of the preferred form of the invention.
Figure 3 is a waveform diagram useful in explaining the operation of the invention.

Figure 1 illustrates the hysteresis loop for the core of the transformer 20 of Figure 2. The core may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 1). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high. The core is an important part of the invention since it is essential that it be composed of a material whose flux density may be increased to saturation in step-by-step fashion in response to spaced pulses of magnetizing force being applied thereto.

Referring now to Figure 2, there is a generator of power pulses PP and a generator of blocking pulses BP which emit substantially square waves as shown in Figure 3. In a practical embodiment of the invention it is possible to combine the source PP and the source BP; however, they are shown separate for the purpose of convenience. The transformer 20 has a primary winding 21 and a secondary winding 22. The secondary winding is energized normally by the circuit including battery 23, resistor 24 and rectifier 25. In order that the energization of the secondary winding 22 will be in the form of pulses instead of in the form of a continuous current, rectifier 26 is provided in series with generator of power pulses PP. The primary winding 21 is energized by flow of current from input 27, through rectifier 28, source of blocking pulses BP, to ground. The input 27 supplies sufficient current through coil 21 so that the core of transformer 20 is always reverted to point 10 on the hysteresis loop of Figure 1 following an input pulse at 27. Rectifier 29 feeds the output pulses to the load L.

If we assume the situation shown in Figure 3, when the source of power pulses PP goes negative as at 30, the cathode of rectifier 26 is negative and current will then flow from battery 23 through resistor 24 and rectifier 26, source PP, to ground. Connection C will, therefore, be negative. Consequently, no current will flow through rectifiers 25 and 29 and there will be no current in the secondary 22 or the load L. However, when the source of power pulses PP emits a positive pulse as at 31, the cathode of rectifier 26 will become positive and therefore current from battery 23 may flow through resistor 24, rectifier 25 and secondary winding 22. The duration of this pulse is limited to the duration of pulse 31, for as soon as the potential of the power pulses PP becomes negative again, the rectifier 26 will again shunt the flow of current away from battery 23 through secondary 22. However, assuming that the power pulses such as 30 and 31 have been arriving for some considerable time prior to the start of the waveforms of Figure 3, no pulses will flow to the load because a succession of power pulses will step by step cause an increase in the magnetization of the core of transformer 20 until saturation point 11 (see Figure 1) is reached. In that case the coil 22 has very low impedance and is a virtual short circuit. Hence, in effect connection C is then connected to ground through low impedance coil 22 and all of the potential of battery 23 appears across the resistor 24 and only a very small current flows to the load L. Hence, as shown in Figure 3, there is no output to the load L prior to the receipt of input pulse 32. When this pulse arrives at input 27, it flows through primary winding 21, rectifier 28, the source of blocking pulses BP, to ground. This pulse resets the core 21 to point 10 on the hysteresis loop. Hence, the next pulse 33 from source PP raises the potential of the cathode of rectifier 26 to a positive value and enables current to flow from battery 23, resistor 24, rectifier 25, secondary 22, to ground. This increases the magnetizing force and the flux density in the core 20 but by one step only and thus moves the core along the hysteresis loop from point 10 to only point 13. Since a large portion of this action takes place on the vertical portion of the hysteresis loop, the coil 22 has high impedance during this period and consequently the majority of the current flowing from battery 23 passes through resistor 24, rectifier 29, to the load L. Hence, pulse 38 appears at the load L coinciding in time with the pulse 33 from source PP. The next pulse 34 from source PP has the same effect as pulse 33, except it drives the core from point 13 to point 14 on the hysteresis loop. Since this is a relatively unsaturated portion of the hysteresis loop, there will be an output pulse 39 at the load L. Likewise, during pulse 35 the core will be driven from point 14 to point 15 on the hysteresis loop and there will be another pulse 40 at the load. During the period of pulse 36 the core will be driven from point 15 to point 16 on the hysteresis loop and there will be an output pulse 41 at the load. During the period of pulse 37, the core will be driven from point 16 on the hysteresis loop to saturation point 11, and during the majority of this pulse period the core will be saturated and consequently coil 22 will have very low impedance, especially at the tail end of the pulse, and consequently a pulse 42 will appear at the load which is too small to have any effect on the remainder of the computer circuit. During the period of the next pulse from source PP, the core will be completely saturated and there will be substantially no output at the load L. This will continue until another input pulse 43 is received at input 27. Pulse 43 will reset the core from point 11 to point 10 on the hysteresis loop so that during the period of the next power pulse 48 from the source PP, the core will be driven from point 10 to point 13 on the hysteresis loop with a consequent output pulse 44 at the load L. During the period of the next power pulse 49, the core will be driven from point 13 to point 14 with a consequent output pulse 45 at the load L. In the absence of any additional input pulses there would be output pulses 46 and 47 (during the periods of power pulses 50 and 51) and no other effective output pulses; however, as shown in Figure 3, if it be assumed that another input pulse 52 is received during the space between pulses 49 and 50, the core 21 will be reset to point 10 by the input pulse 52. Hence, during the period of the next power pulse 50, the core will be driven from point 10 to point 13 on the hysteresis loop with a consequent output pulse 46. During the period of the power pulse 51 the core will be driven from point 13 to point 14 on the hysteresis loop with a consequent output pulse 47. During the periods of the next two power pulses 53 and 54 there will be respectively output pulses 55 and 56 and no other effective output pulses.

The foregoing description shows the reset feature of the device. As was explained, following a single pulse 32 there was a series of four output pulses 38 to 41 inclusive. In other words, a single input pulse will produce four output pulses. Pulse 43, in the absence of pulse 52 would have likewise produced four output pulses 44 to 47 inclusive. However, since pulse 52 was received prior to the termination of the four pulses 44 to 47 inclusive, the core was reset and four pulses appeared following the last input pulse 52, namely pulses 46, 47, 55 and 56.

The blocking pulse generator BP is not absolutely necessary but is provided to prevent flow of current in the input circuit 27 following a flow of current through coil 22 from battery 23. During the periods when battery 23 supplies current through coil 22, when the core 20 is unsaturated, a potential is induced in coil 21. This potential would always occur during one of the positive power pulses of source PP, for example pulse 31. If a blocking pulse generator BP is provided in series with coil 21, and having such polarity that it will render the cathode of rectifier 28 negative during the period when current is flowing through coil 22, the rectifier 28 will be in a non-conducting state and any potential induced in coil 21 from coil 22 will not cause any flow of current in the input circuit.

It follows from the foregoing description that there is provided a delay flop which can readily operate in a computer circuit employing magnetic amplifiers. Such a computer circuit would normally provide the source of power pulses PP, the source of blocking pulses BP and the source of direct current 23. Consequently, the only components that must normally be added are the transformer 20, the resistor 24, and the several rectifiers. These components are all extremely small in size and reliable in operation. Moreover, the input and outputs are of such nature as to readily cooperate with other elements of a computer circuit embodying magnetic amplifiers.

While I have described the invention as a delay flop that is resettable, it is possible within the broadest aspects of the invention to render the circuit non-resettable. This could be done, for example, by employing any form of relay, (which may be a magnetic amplifier type of device) which will break the input circuit 21 during any series of output pulses at the load L. This and numerous other changes may be made without departing from the broadest aspects of the invention and consequently I am defining the scope of the invention in the appended claims.

The circuit of Figure 2 is substantially identical with the non-complementing parallel magnetic amplifier circuit disclosed in Figure 11 of the prior copending application of John Presper Eckert, Jr., and Theodore H. Bonn, Serial No. 382,180, filed September 24, 1953, entitled "Signal Translating Device" or in Figure 13 of the prior copending application of John Presper Eckert, Jr., Serial No. 448,206, filed August 6, 1954, entitled "Magnetic Counter Circuits," both assigned to the same assignee as the present application. The novelty in the present application is not necessarily in a circuit detail but in the basic concept that a magnetic amplifier circuit may be so constructed and arranged as to act as a delay flop. In the form of the invention illustrated, it is the proper proportioning of the circuit components that affects the result. In particular, the duration of the pulses, the potential of battery 23, the resistance value of resistor 24, and the number of turns on secondary 22 are all so related to the size and characteristics of the core 20, that the surges of current through secondary 22 will respectively raise the flux density in successive steps up the hysteresis loop of Figure 1. By varying these foregoing values, the device may be adjusted to require any predetermined number of pulses before the core reaches saturation and cuts off output to the load; provided, however, it is to be understood that while theoretically the values of the components may be so selected that a very large number of output pulses may be produced in response to a single input pulse, as a practical matter this number is definitely limited.

The current flowing through secondary 22 is furnished by battery 23 and resistor 24; however the potential across rectifier 25 and secondary 22 is determined by the potential of source PP. In one typical device built according to the above disclosure the source PP had a potential of 10 volts, the core 20 had a saturation flux of 20 maxwells, the frequency of the alternating current at source PP was 125 kilocycles and the winding 22 had 100 turns. Under these circumstances, four power pulses were required to saturate the core. The battery 23 had sufficient potential in excess of 10 volts and resistor 24 had sufficiently low resistance that the potential of 10 volts across source PP appeared across rectifier 25 and secondary 22.

I claim to have invented:

1. A device of the class described comprising a saturable core having a winding thereon, said core being composed of such a material that its flux density may be successively increased in step by step fashion in response to a series of spaced current pulses through said winding, input means for reverting the core to a given point on its hysteresis loop in response to given input conditions, means including a source of spaced power pulses for successively energizing said winding in response to the series of spaced current pulses until after a predetermied number of pulses the core reaches saturation, and output means responsive to the potential developed across said winding.

2. A device of the class described comprising a saturable core having a winding thereon, said core being composed of such a material that its flux density may be successively increased in step by step fashion in response to a series of spaced current pulses passing through said winding, an input, means which in response to predetermined conditions at said input causes successive current pulses to pass through the winding to raise the flux density of the core by one step in response to each said pulse until after a predetermined plurality of pulses the core reaches saturation, and output means controlled by whether or not the core is saturated, each step being a fraction, not greater than one-half, of the flux density required to saturate the core.

3. A device of the class described comprising an input, a source of spaced pulses, means for producing a series of output pulses spaced the same as the first-named pulses in response to a predetermined condition at said input, the last-named means including a saturable core of a type whose flux density may be increased in step by step fashion in response to spaced surges of magnetizing force applied thereto and a winding on said core through which pulses from said source pass to increase the flux density of the core in said step by step fashion, and output means controlled by the impedance of said winding, the size and material of the core being so related to the winding, the amplitude of the current and the spacing of the pulses that a plurality of said pulses must flow through the winding before the flux density of the core is increased in step by step fashion to a sufficient extent to saturate the core.

4. A device of the class described comprising a source of spaced power pulses, a saturable core composed of a material whose flux density may be increased in step-by-step fashion in response to spaced surges of magnetizing force applied thereto, an output, means for increasing the flux density in said core along an unsaturated portion of its hysteresis loop in response to each said power pulse and which after a predetermined number of power pulses saturates the core, and means controlling the current in the output in accordance with whether or not the core is saturated.

5. A delay flop as defined in claim 4 including input means for resetting the core to a given point on its hysteresis loop in response to predetermined input conditions.

6. A delay flop as defined in claim 4 which is resettable comprising input means for at any time resetting the core to a given point on its hysteresis loop in response to predetermined input conditions.

7. A delay flop comprising a transformer having a saturable core composed of such material that the flux density thereof may be successively increased in step by step fashion in response to a series of spaced surges of magnetizing force, means including a primary winding on the core for resetting it to a given point on its hysteresis loop in response to an input pulse, a source of spaced pulses, a secondary winding on said core for receiving pulses from said source, the spacing and amplitude of the pulses being so related to the core material and the secondary winding that it requires a plurality of said pulses to increase the flux density in step by step fashion to saturation, and output means controlled by the impedance of said secondary winding.

8. A delay flop comprising a transformer having a saturable core with a primary winding thereon; input means connected to the primary winding to reset the core to a given point on its hysteresis loop; said core being of such material that its flux density may be increased in step by step fashion by a series of spaced surges of magnetizing force therein; a secondary winding on the core; a series circuit including a source of direct current, a resistor, a rectifier and said secondary winding connected together in that order; a source of spaced power pulses; a rectifier connecting said source of pulses to the junction between said resistor and the first-named rectifier, the polarities of the rectifiers and of said last-named source being such that during alternate periods the current from the first-named source is shunted through the second-named source to thereby reduce the current flow through said secondary winding and during the remaining periods is forced through said secondary winding; and output means responsive to the magnitude of current flow in said secondary winding; the spacing of the pulses from the second-named source, the potential of the first-named source, the resistance value of said resistor, the number of turns on said secondary winding, and the characteristics of the core material being all so related to each other that in response to successive pulses the flux density of the core will be increased along an unsaturated portion of the hysteresis loop in step by step fashion until ultimately after a predetermined number of current pulses through the secondary winding the core is driven to saturation at which time the current in said output means is altered.

9. A delay flop as defined in claim 8 in which the output means includes a rectifier and a load in series with each other and these two devices taken as a unit being shunted across the combination of the first-named rectifier and the secondary winding taken as a unit.

10. A delay flop as defined in claim 9 including means in series with the primary winding for blocking flow of any current in that winding resulting from induction of current from the secondary when pulsed current flows in the latter.

11. A device of the class described comprising a saturable core having a winding thereon, said core being composed of a material having a substantially rectangular hysteresis loop and whose flux density may be changed in step-by-step fashion in response to spaced surges of magnetizing force applied thereto, input means for reverting the core to a given point on its hysteresis loop in response to given input conditions, a source of spaced power pulses for successively energizing said winding with pulses of such small magnitude that one pulse will not alone drive the core to saturation, whereby a predetermined number of pulses are required before the core reaches saturation, and output means responsive to the potential developed across said winding.

12. A delay flop comprising a source of spaced power pulses, a saturable core having a substantially rectangular hysteresis loop and whose flux density may be changed in step-by-step fashion in response to spaced surges of magnetizing force applied thereto, an output, means for increasing the flux density in said core along a vertical portion of its hysteresis loop a distance not greater than half that required to reach a horizontal portion of the loop in response to each said power pulse and which after a predetermined number of power pulses saturates the core, and means controlling the current in the output in accordance with whether or not the core is saturated.

13. A delay flop as defined in claim 12 including input means for resetting the core to a given point on its hysteresis loop in response to predetermined input conditions.

14. A delay flop as defined in claim 12 which is resettable comprising input means for at any time resetting the core to a given point on its hysteresis loop in response to predetermined input conditions.

15. A delay flop as defined in claim 7 in which the core is composed of a material having a substantially rectangular hysteresis loop.

References Cited in the file of this patent

UNITED STATES PATENTS

| | | |
|---|---|---|
| 2,430,457 | Dimond | Nov. 11, 1947 |
| 2,478,911 | Francis | Aug. 16, 1949 |
| 2,576,026 | Meacham | Nov. 11, 1951 |
| 2,682,615 | Sziklai et al. | June 29, 1954 |